US009195734B2

(12) United States Patent
Sar et al.

(10) Patent No.: US 9,195,734 B2
(45) Date of Patent: Nov. 24, 2015

(54) ASSOCIATING A TASK COMPLETION STEP OF A TASK WITH A TASK TEMPLATE OF A GROUP OF SIMILAR TASKS

(71) Applicant: Google Inc., Mountain View, CA (US)

(72) Inventors: Erwin Can Sar, Mountain View, CA (US); Timothy Youngjin Sohn, Mountain View, CA (US); Andrew Tomkins, Menlo Park, CA (US)

(73) Assignee: GOOGLE INC., Mountain View, CA (US)

( * ) Notice: Subject to any disclaimer, the term of this patent is extended or adjusted under 35 U.S.C. 154(b) by 127 days.

(21) Appl. No.: 14/090,265

(22) Filed: Nov. 26, 2013

(65) Prior Publication Data
US 2015/0149467 A1 May 28, 2015

(51) Int. Cl.
*G06F 17/30* (2006.01)
*G06F 9/46* (2006.01)
*G06F 9/48* (2006.01)

(52) U.S. Cl.
CPC ............ *G06F 17/30598* (2013.01); *G06F 9/46* (2013.01); *G06F 9/466* (2013.01); *G06F 9/48* (2013.01); *G06F 17/30* (2013.01)

(58) Field of Classification Search
None
See application file for complete search history.

(56) References Cited

U.S. PATENT DOCUMENTS

| | | | |
|---|---|---|---|
| 5,603,054 A | 2/1997 | Theimer et al. | |
| 6,842,877 B2 | 1/2005 | Robarts et al. | |
| 7,496,500 B2 | 2/2009 | Reed et al. | |
| 7,660,820 B2 * | 2/2010 | Alexander et al. | 718/100 |
| 8,055,707 B2 | 11/2011 | Desai et al. | |
| 8,108,206 B2 | 1/2012 | Hufnagel et al. | |
| 8,364,467 B1 | 1/2013 | Bowman et al. | |
| 8,375,099 B2 | 2/2013 | Carroll et al. | |
| 8,417,650 B2 | 4/2013 | Graepel et al. | |
| 8,521,818 B2 | 8/2013 | McGann et al. | |
| 8,560,487 B2 | 10/2013 | Jhoney et al. | |
| 8,599,801 B2 | 12/2013 | Baio et al. | |
| 2003/0061266 A1 * | 3/2003 | Ouchi | 709/106 |
| 2003/0083936 A1 | 5/2003 | Mueller et al. | |
| 2003/0217089 A1 * | 11/2003 | Bakow et al. | 709/100 |
| 2006/0224432 A1 * | 10/2006 | Li | 705/9 |
| 2007/0245261 A1 | 10/2007 | Bukovec et al. | |
| 2009/0113432 A1 * | 4/2009 | Singh et al. | 718/102 |

(Continued)

OTHER PUBLICATIONS

Corston-Oliver, Simon et al, "Task-Focused Summarization of Email," Microsoft Research Jul. 2004, (http://www1.cs.columbia.edu/~lokesh/pdfs/Corston.pdf), 8 pages.

(Continued)

*Primary Examiner* — Emerson Puente
*Assistant Examiner* — Benjamin Wu
(74) *Attorney, Agent, or Firm* — Middleton Reutlinger

(57) ABSTRACT

Methods and apparatus related to associating a task completion step with a task template based on one or more task completion steps of tasks that conform to the task template. A task template may include one or more terms, entities, and/or category of entities. A Task conforms to the task template when the task includes the one or more terms, entities, and/or an identifier of an entity that is a member of the entity category. In some implementations, a task that is associated with a task completion step is identified as conforming to the task template and the task completion step of the conforming task is associated with the task template. In some implementations, the task template may be utilized to associate a task completion step with a task that conforms to the task template.

24 Claims, 6 Drawing Sheets

(56) References Cited

U.S. PATENT DOCUMENTS

| | | |
|---|---|---|
| 2009/0307212 A1 | 12/2009 | Ramot et al. |
| 2012/0150532 A1 | 6/2012 | Mirowski et al. |
| 2012/0239761 A1 | 9/2012 | Linner et al. |
| 2012/0317499 A1 | 12/2012 | Shen |
| 2012/0331036 A1 | 12/2012 | Duan et al. |
| 2013/0073662 A1 | 3/2013 | Meunier et al. |
| 2013/0159270 A1 | 6/2013 | Urmy et al. |
| 2013/0297551 A1 | 11/2013 | Smith et al. |

OTHER PUBLICATIONS

Laclavik, et al., "Email Analysis and Information Extraction for Enterprise Benefit," Institute of Informatics, Slovak Academy of Sciences, Slovakia, Computing and Informatics, vol. 30, 2011, pp. 57-87.

International Search Report and Written Opinion of PCT Serial No. PCT/US14/67733 Aug. 12, 2015.

* cited by examiner

ASSOCIATING A TASK COMPLETION STEP OF A TASK WITH A TASK TEMPLATE OF A GROUP OF SIMILAR TASKS

BACKGROUND

A user may have interest in creating one or more tasks and the user may utilize one or more applications to create the tasks. A task may be created that includes one or more completion steps that may be performed to complete the task.

SUMMARY

This specification is directed to methods and apparatus related to determining a task template and associating one or more completion steps with the task template. Some implementations of the specification are generally directed to determining one or more task completion steps to associate with a task template. Determining one or more task completion steps to associate with a task template may include: determining a task template that includes one or more entity categories, determining a task group of tasks that include one or more entities of the one or more entity categories of the task template, and associating one or more task completion steps that are associated with one or more of the tasks of the task group with the task template. The task group includes tasks that include an entity that is a member of one or more of the entity categories of the task template. Additionally, a task group may be determined based on similarity between one or more terms and/or entities of the tasks in the task group and one or more terms and/or entities of the task template. Some implementations of the specification are generally directed to identifying a task that conforms to a task template and associating one or more task completion steps that are associated with the task template to the conforming task.

In some implementations, a method is provided and includes the steps of: identifying an entity category, wherein the entity category is a grouping of entities that share one or more aspects in common; determining a task template, the task template including a task action identifier and a task object identifier, and one of the task action identifier and the task object identifier being an indication of the entity category; identifying a plurality of tasks, each of the plurality of tasks associated with a task entity, and at least one of the plurality of tasks associated with a task completion step; determining a task group of one or more of the plurality of tasks that conform to the task template, a given task of the task group conforming to the task template if the task entity of the task is a member of the entity category; determining a group task completion step, the group task completion step based on a task completion step associated with one or more of tasks of the task group; and associating the group task completion step with the task template.

This method and other implementations of technology disclosed herein may each optionally include one or more of the following features.

Each of the plurality of tasks may include a task action and a task object. The task action of each of the tasks may be the task entity, the task object identifier an indication of a template entity, and conformity of a task to the task template based on similarity between the template entity and the task object. The task object of each of the tasks may be the task entity, the task action identifier being an indication of a template entity, and conformity of a task to the task template based on similarity between the template entity and the task action.

At least one of the task action and the task object of each of the tasks of the task group may be associated with a task textual representation. At least one of the task action identifier and the task object identifier may be associated with a template textual representation, and conformity of a given task of the task group being based on textual similarity between the task textual representation and the template textual representation. Conformity of each task to the task template may include determining whether the task textual representation of a given task of the task group is an alias of an entity that is a member of the entity category.

The method may further include the steps of: identifying an additional task completion step for an additional task of the task group; associating the additional task completion step with the task template; and ranking the group task completion step and the additional task completion step for the task template.

The ranking of the group task completion step and the additional task completion step may be based on counts of occurrences of associations of the group task completion step and the additional task completion step to the tasks of the task group. The ranking of the group task completion step may be higher than the ranking of the additional task completion step when the count of occurrences of associations of the group task completion step is greater than the count of occurrences of associations of the additional task completion step. Associating the group task completion step with the task template may occur only when the ranking of the group completion step satisfies a threshold.

The method may further include the steps of: receiving an additional task of a user; determining a similarity measurement, the similarity measurement being indicative of conformity of the additional task to the task template; and associating the group task completion step with the additional task if the similarity measurement satisfies a threshold value.

The method may further include the step of providing the group task completion step to the user in response to receiving the additional task of the user. Those methods may further include the steps of: identifying an uncategorized task of the plurality of tasks, the uncategorized task being associated with an uncategorized task completion step, and the uncategorized task not a task of the task group; determining that the uncategorized task conforms to the task template; and associating the uncategorized task with the task group.

The method may further include the step of associating the uncategorized task completion step with the task template. The group task completion step may include an indication of a completion entity category.

The completion entity category may be the entity category. The group task completion step may include a completion action and a completion object, one of the completion action and the completion object being associated with the completion entity category.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

Particular implementations of the subject matter described herein identify an entity category, determine a task template that includes the identified entity category, determine a task group of tasks that conform to the task template, determine a task completion step of a task that conforms to the task template, and associate the task completion step with the task template. The task template may be utilized to associate the task completion step with a task that conforms to the task template and that is not associated with the task completion step.

It should be appreciated that all combinations of the foregoing concepts and additional concepts discussed in greater detail herein are contemplated as being part of the inventive subject matter disclosed herein. For example, all combinations of claimed subject matter appearing at the end of this disclosure are contemplated as being part of the inventive subject matter disclosed herein.

DETAILED DESCRIPTION

Figure 1:
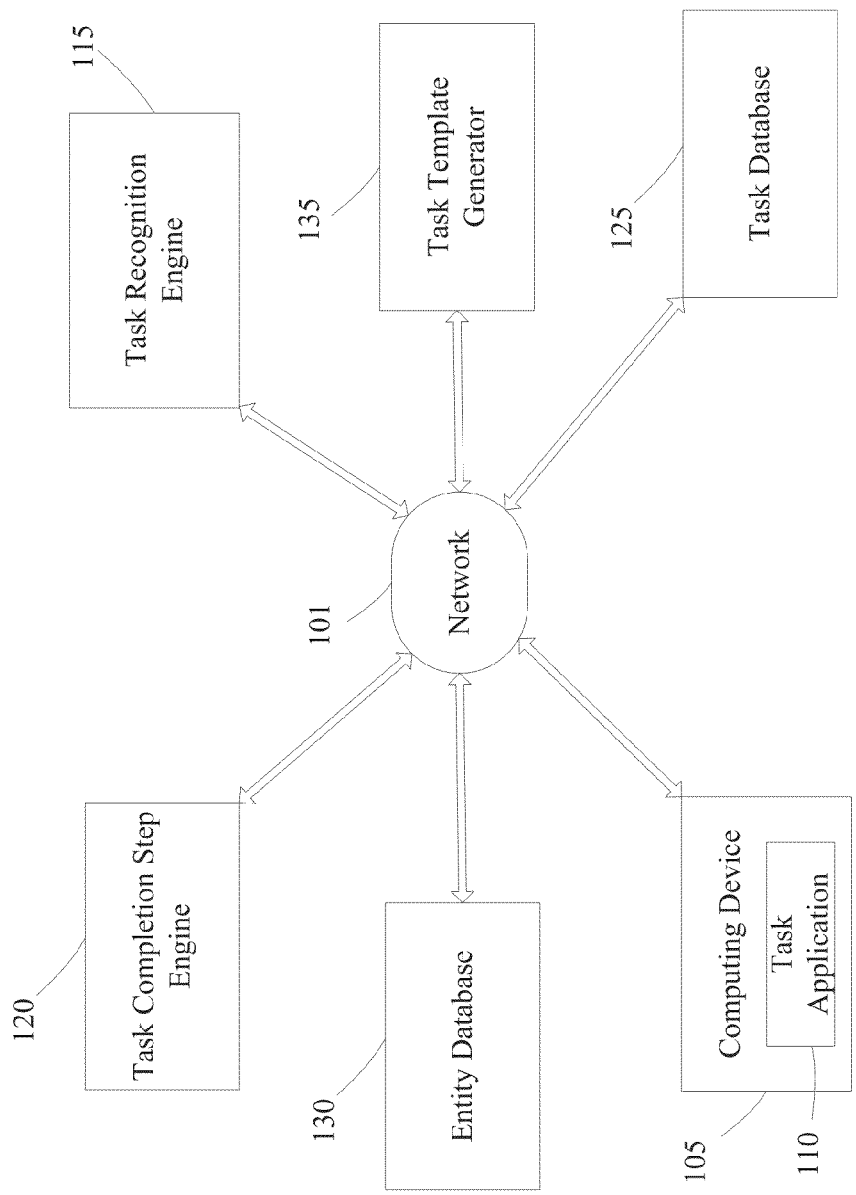
FIG. 1 illustrates a block diagram of example environment in which a task template may be determined and a task completion step may be associated with the task template.

A user may have interest in completing a task and may indicate interest in completing the task and/or locating information regarding the completion of the task via one or more applications. For example, a user may submit a search query "pay my cell phone bill" to a web browser to identify one or more steps that may be performed by the user to complete the task of paying a cellular phone bill. The user may navigate to a webpage that includes contact information for the cellular phone provider of the user, such as a phone number, a mailing address, and/or an email address of the billing department. The user may utilize this information to complete the task of paying a cellular phone bill.

A task may be determined and associated with a user based on identified actions and/or information that is associated with a user. For example, one or more applications may identify that a user has submitted a search query to determine how to complete a task and the application may determine a task that is associated with one or more completion steps that may be performed to complete the task. User actions may be, for example, submitting information that is identified as indicative of a user intending to perform a task, information that is associated with the user that may be utilized to complete a task, and/or an explicit submission from a user to create a task.

A task includes an objective, which may include a task action and a task object that is associated with the task action. The task action may be an action that a user has interest in completing and/or having completed by one or more entities. For example, a task action may be "buy" and the user may have interest in buying something and/or having another person buy something for the user. A task object is an entity that is associated with the task action. For example, a task may have a task action of "buy" and a task object of "bananas," and the task objective may be for the user to buy bananas.

In some implementations, an identified task may be associated with one or more task completion steps. A task completion step includes one or more completion actions and may include one or more completion objects. For example, a task completion step may be "travel to the mall," where the completion action is "travel" and the completion object is "mall." In some implementations, a user may submit information via one or more applications; a task may be determined based on the information; and one or more task completion steps may be determined based on, for example, the submitted task, additional information that is associated with the user and/or the task, additional information that is identified from one or more databases, and/or one or more previous tasks that have been submitted by the user and/or other users. For example, a user may submit a search query of "pay cell phone bill" and the name of the cellular phone provider of a user may be identified via additional information that is associated with the user, such as emails of the user, phone contacts of the user, and/or browsing history of the user. Additional information from an email may be utilized to, for example, determine and associate a task objective of "pay my cellular phone bill" with a completion step of "Call 555-555-5555" based on a billing department phone number that was identified from the email.

In some implementations, completion steps for a task may be provided to the user when it is convenient for the user to complete the task and/or when it is appropriate to complete the task based on the satisfaction of one or more conditions. For example, a user may create an entry in calendar application to "Contact Bob," a task may be determined based on the entry, and a completion step of "Call 555-5555" may be determined based on identifying a contact number of "555-5555" for "Bob" in a contacts application of the user. The user may be provided with the task completion step of "Call 555-5555" on the date that the user has indicated in the calendar application and/or when the user utilizes and/or is located near a cellular phone. The task completion step may include populating a dialing application of the cellular phone with the phone number and/or providing a notification to the user to perform the completion step of "calling Bob."

In some circumstances, completion steps may not be determined due to a lack of information regarding how to complete a task and/or because a new type of task is encountered. Additionally or alternatively, a task may have additional completion steps in addition to task completion steps that are determined for the task. When task completion steps for a task are unknown and/or a task may have additional task completion steps, known task completion steps of a similar task may be associated with the task based on a likelihood that similar tasks may be associated with similar completion steps. For example, a task of "buy bananas" may be associated with the task completion step of "Go to the grocery store," but the task of "buy rhubarb" may not be associated with a task completion step. Based on identifying that terms in the two tasks are similar (i.e., both bananas and rhubarb are produce), one or more components may determine that it is likely that both tasks may be completed at a grocery store. The user may be provided the task completion step of "Go to the grocery store" based on the similarity between the tasks.

In some implementations, one or more components of a task may be associated with a textual representation. For example, a task to call a contact may include a textual representation of the task objective "Call Bob," the task action "Call," and/or the task object "Bob." Also, for example, a task to purchase a product may include a textual representation of the task objective "Purchase bananas," a task action "Purchase," and/or a task object "bananas." In some implementations, textual representations of tasks may be identified based on information that is identified when a user creates a task utilizing one or more applications. For example, a user may enter "Purchase bananas" into a task application and/or submit a search query of "purchase bananas" to a search engine, and the terms entered by the user may be utilized to associate a textual representation with the determined task.

In some implementations, textual representations that are associated with a task may be a modified form of any textual representation that was utilized to determine the task. Modification of textual representations may include, for example, replacing a term with a canonical form, reordering of terms, replacing terms with synonyms, and/or correcting misspellings. For example, a determined task that is based on the user submitting the query "calling phone company" may be associated with the textual representation "call phone company" as a task objective and/or the task action for the task may be associated with a textual representation "call" based on replacing "calling" with a canonical form of "call." In some implementations, one or more stop words ("to," "for," "at," etc.) may be removed from textual representations. For example, a user may submit the query "pay the cell phone bill" and the textual representation that is associated with the determined task may be "pay cell phone bill."

In some implementations, one or more components of a task may be represented by a reference to an entity in a database. For example, a task action may be a reference to an entity that is associated with the action "Buy." In some implementations, a task component that is a textual representation may be utilized to identify an entity that may additionally be associated with one or more synonyms that may replace the action, such as an entity associated with the alias "Buy" and that is additionally associated with the alias "Purchase."

In some implementations, one or more tasks may be identified and a task template may be determined based on the identified tasks. For example, tasks with task objectives of "Buy bananas" and "Buy oranges" may be identified based on both tasks objectives including the term "Buy" and the name of a fruit. Additional tasks that include "Buy" and a name of a fruit may be identified as similar and a task template may be determined that includes the term "Buy" and a category [fruit] (As used herein, a term in square brackets denotes a category that may be replaced with one or aliases of entities that are members of the category). One or more of the tasks that conform to the task template may be associated with a task completion step, and based on the task conforming to the task template, the task template may additionally be associated with the task completion step. For example, a task template for tasks of "buy [fruit]" may be associated with the task completion step "Travel to the grocery store," and the task template may be associated with that completion step. Additional task completion steps of tasks that conform to the task template may be associated with the task template.

Referring to FIG. 1, a block diagram is illustrated of example environment in which a task template may be determined and a task completion step may be associated with the task template. The environment includes a computing device 105 with task application 110, task recognition engine 115, task completion step engine 120, task template generator 135, an entity database 130, and a task database 125. The environment also includes a communication network 101 that enables communication between various components of the environment. In some implementations, the communication network 101 may include the Internet, one or more intranets, and/or one or more bus subsystems. The communication network 101 may optionally utilize one or more standard communications technologies, protocols, and/or inter-process communication techniques.

Figure 6:
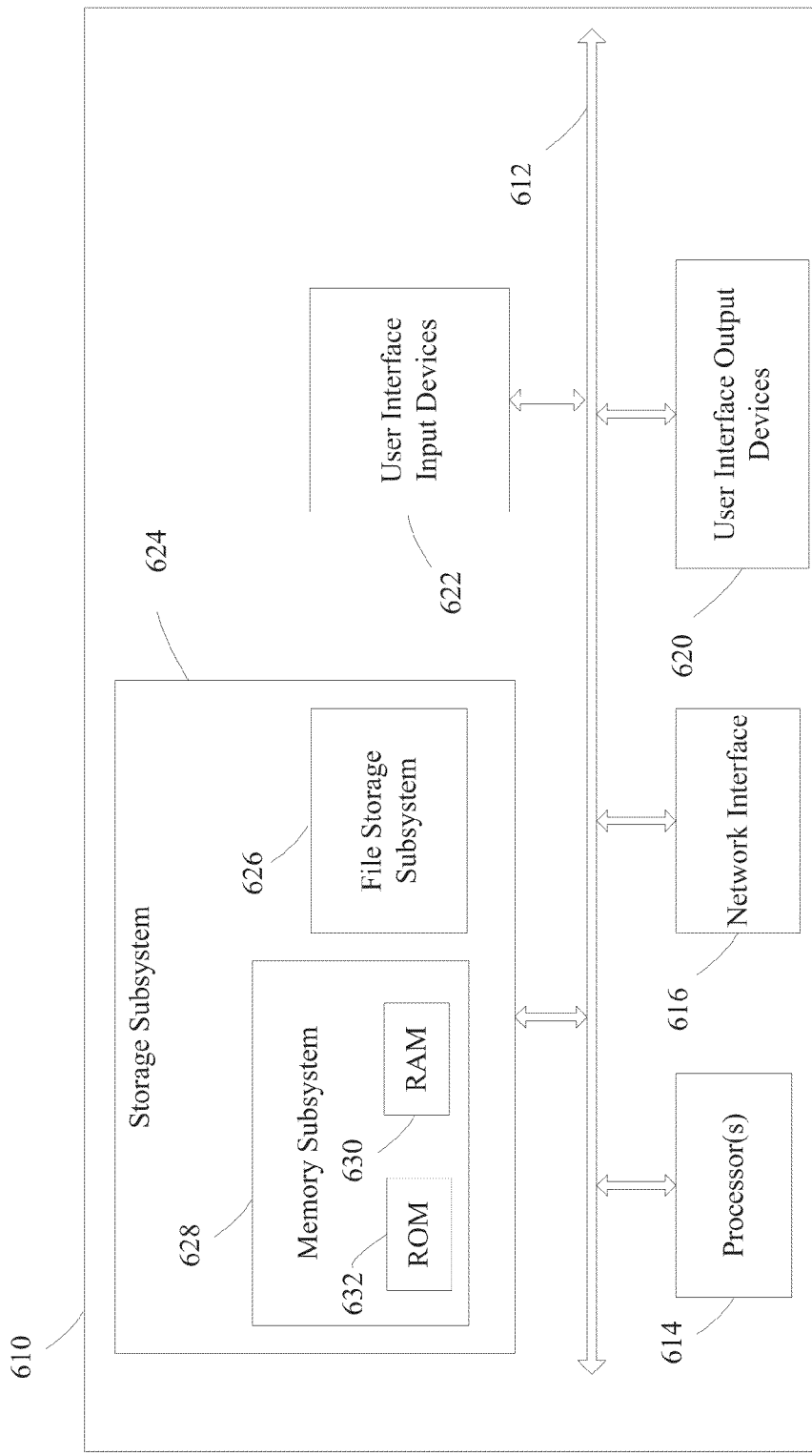
FIG. 6 illustrates a block diagram of an example computer system.

The computing device 105 executes one or more applications and may be, for example, a desktop computer, a laptop computer, a cellular phone, a smartphone, a personal digital assistant (PDA), a tablet computer, a navigation system, a wearable computing device (e.g., glasses, watch, earpiece), and/or other computing device. The computing device 105 includes memory for storage of data and software applications, a processor for accessing data and executing applications, and components that facilitate communication over a communication network 101. In some implementations, the computing device 105 may include hardware that shares one or more characteristics with the example computer system that is illustrated in FIG. 6. In some implementations, the one or more applications executed by the computing device 105 may include a task application 110. As discussed herein, the computing device 105 may optionally be utilized to, directly or indirectly, identify one or more actions of a user and provide user task information and/or additional information to one or more components. The task application 110 may be utilized to access one or more applications such as, for example, e-mail applications and/or calendar applications. In some implementations, task application 110 may be an add-on to one or more other applications that are executing on computing device 105. In some implementations, task application 110 may be an application that performs one or more actions in addition to identifying task information. For example, task application 110 may be a web browser and additionally provide one or more components with task information based on browser input by a user. Additionally or alternatively, task application 110 may be an application that is dedicated to creating tasks. For example, a user may intend to create a task and the user may utilize task application 110 to submit information to create the intended task.

Figure 4:
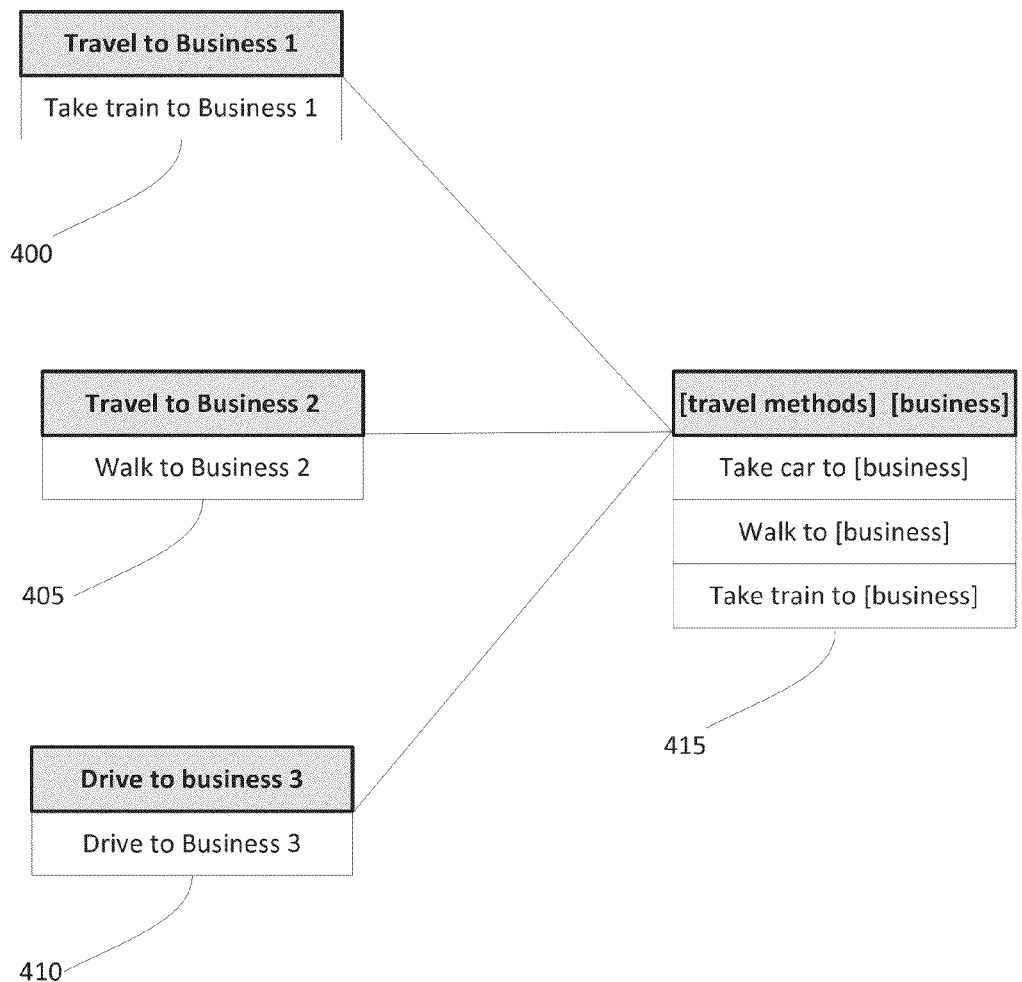
FIG. 4 is another example illustration of tasks that may be identified and utilized to determine a task template.

The task recognition engine 115, the task completion step engine 120, task template generator 135, and/or one or more additional components of the example environment of FIG. 1 may each include memory for storage of data and software applications, a processor for accessing data and executing applications, and components that facilitate communication over a network. In some implementations, task recognition engine 115, task completion step engine 120, and/or task template generator 135 may include hardware that shares one or more characteristics with the example computer system that is illustrated in FIG. 4. The operations performed by other components of the example environment may be distributed across multiple computer systems. For example, task recognition engine 115, the task completion step engine 120, and/or task template generator 135 may be computer programs running on one or more computers in one or more locations that are coupled to each other through a network.

In some implementations, entity database 130 may be utilized to identify and/or store one or more entities that may be associated with one or more components of a task, such as action entities and/or completion entities. For example, entity database 130 may include a mapping (e.g., data defining an association) between entities and, for each entity, one or more properties and/or other entities related to the entity. In some implementations, entities are topics of discourse. In some implementations, entities are persons, places, concepts, and/ or things that can be referred to by a textual representation (e.g., a term or phrase) and are distinguishable from one another (e.g., based on context). For example, the text "bush" in a query or on a webpage may potentially refer to multiple entities such as President George Herbert Walker Bush, President George Walker Bush, a shrub, and the rock band Bush. In some implementations, an entity may be referenced by a unique entity identifier that may be used to identify the entity. The unique entity identifier may be associated with one or more properties associated with the entity and/or with other entities. For example, in some implementations, the entity database 130 may include properties associated with unique identifiers of one or more entities. For example, a unique identifier for the entity associated with the airport with an airport code "LAX" may be associated with a name or alias property of "LAX," another alias property of "Los Angeles International Airport" (an alternative name by which LAX is often referenced), a phone number property, an address property, and/or an entity category property of "airport" in the entity database 130. In some implementations the entity database 130 may include links between nodes and data that identifies the relationship between entities represented by linked nodes. For example, an entity that is an entity category and represented by a node may include links to entities that are members of the entity category and data that identifies those linked entities as members of the entity category. Additional and/or alternative properties may be associated with an entity in one or more databases.

In some implementations, task database 125 may be utilized by one or more components to store tasks, access tasks, and/or store one or more task templates. The task database 125 may include one or more storage mediums. For example, in some implementations, the task database 125 may include multiple computer servers each containing one or more storage media. Information discussed herein may optionally be stored in the task database 125 and/or an additional database. For example, tasks and associated information (e.g., actions, objects, unique entity identifiers, textual representations of associated information, completion steps, etc.) may be stored in task database 125 for later access by one or more components. In this specification, the term "database" will be used broadly to refer to any collection of data. The data of the database does not need to be structured in any particular way, or structured at all, and it can be stored on storage devices in one or more locations. Thus, for example, the database may include multiple collections of data, each of which may be organized and accessed differently.

A task template may be utilized to identify one or more task completion steps. A task template may include one or more entity categories, and may additionally include one or more entities and/or one or more terms. A task that includes the one or more entities of a task template, includes the one or more of the entities of the task template, and/or includes the one or more terms of the task template may be identified as conforming to the task template. In some implementations, a similarity measurement between a task and a task template may be determined that is indicative of whether the task conforms to the task template. The task may be determined to be conforming to the task template if the similarity measurement satisfies a threshold conformity value.

In some implementations, task completion step engine 120 may be unable to identify a task completion step for a task. For example, task completion step engine 120 may be provided with a task that has not been previously encountered and/or that is not present in task database 125. Task completion step engine 120 may not be able to determine task completion steps for the task based on lack of information. For example, additional information that is provided with a task may not be sufficient to determine task completion steps and/or task completion step engine 120 may be unable to determine additional information from one or more databases. In some implementations, task completion step engine 120 may determine a task completion step for a task, but additional unidentified task completion steps may be appropriate for the task. Task completion step engine 120 may utilize one or more previously determined task templates to determine a task completion step to provide to a user.

Task template generator 135 may determine one or more task templates. In some implementations, the task template generator 135 may determine a task template based on tasks that have been submitted by one or more users. In some implementations, the tasks may be identified from the task database 125. In some implementations, task recognition engine 115 and/or task completion step engine 120 may provide tasks to task template generator 135 that were determined based on information that is associated with and/or provided by a user. In some implementations, task recognition engine 115 and/or task completion step engine 120 may provide the tasks to task template generator 135 in real time.

In some implementations, task template generator 135 may determine one or more task templates independent of previously submitted tasks. For example, task template generator 135 may identify one or more entities, entity categories, and/or one or more terms and determine a task template based on the identified components. Also, for example, task template generator 135 may identify one or more components and determine one or more additional components of the task template based on previously submitted tasks and/or additional information from one or more databases. For example, task template generator 135 may identify an entity category of [fruit] from one or more databases, identify one or more tasks that have been submitted that include an entity that is a member of [fruit], and create a task template that includes [fruit] and one or more additional terms and/or entities that are included in the identified tasks. Also, for example, task template generator 135 may identify an entity category of [fruit] and determine a template that includes the entity category [fruit] and one or more entities that are associated with members of the [fruit] category, such as entites associated with the terms "Buy" and/or "Eat."

A task template may include one or more entities that may be utilized to identify tasks that conform to the task template. For example, for a task template of "Pay [bill]," "Pay" may be a textual representation of an entity and/or an identifier of an entity that is associated with the action of paying for a service or product. A task with a task object that is a member of the entity category [bill] and that includes a task action that is associated with an entity of "Pay" may be included in a task group of tasks that conform to the task template "Pay [bill]." For example, a task with a task objective of "Pay cell phone bill" may be included in a task group of tasks that conform to the task template "Pay [bill]" based on the task including a reference to a "Pay" entity and the task including a reference to an entity that is a member of a [bill] category.

To determine a task template, task template generator 135 may identify an entity category in the entity database 130. An entity category is a grouping of entities that share one or more common aspects. For example, task template generator 135 may identify an entity category of [fruit] from entity database 130 that includes entities in the entity database 130 that are fruits (e.g., entities associated with the fruits bananas, apples, oranges, etc.). In some implementations, task template generator 135 may identify one or more aliases for entities in entity database 130 that are members of the entity category. For example, an entity that represents the fruit "bananas" may be associated with the alias "bananas." Also, for example, a single entity may be associated with multiple aliases, such as "cantaloupe" and "muskmelon" (both names for the same fruit).

Figure 3:
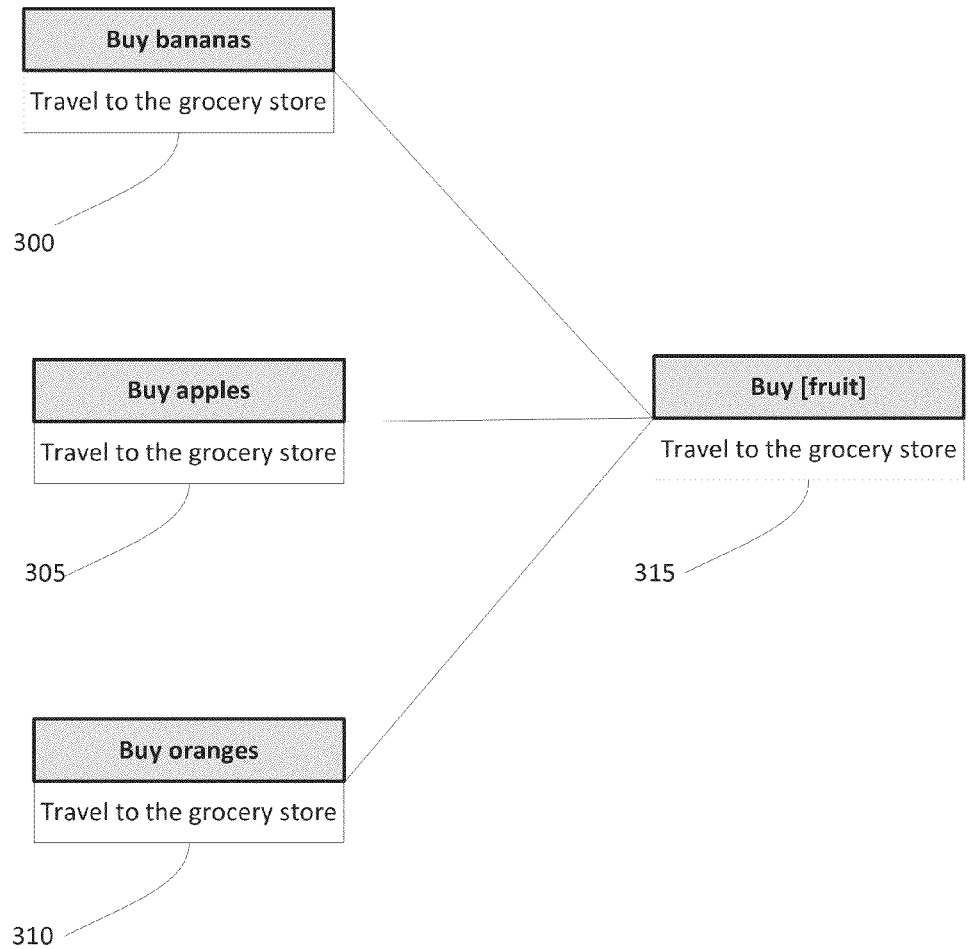
FIG. 3 is an example illustration of tasks that may be identified and utilized to determine a task template.

In some implementations, task template generator 135 may identify one or more tasks from task database 125 and/or may utilize one or more tasks that are provided by task recognition engine 115 to determine one or more additional terms to include in a task template. For example, task template generator 135 may identify an entity category of [fruit], identify tasks that include an alias for an entity that is a member of the [fruit] category, and identify additional terms and/or entities in the task objectives of the tasks. For example, referring to FIG. 3, an example of identified tasks and an associated task template is provided. Tasks 300, 305, and 310 include a textual representation of a task objective for each task in a bold box. For example, task 300 includes the terms "Buy bananas," which is a representation of the task action "buy" and the task entity "bananas." The tasks additionally include a task completion step in a non-bold box below the task objectives. For example, task 300 includes the task completions step of "Travel to the grocery store," which may alternatively be represented by a textual representation of the completion action "travel" and the completion object "grocery store." In the illustrated example, the tasks 300, 305, and 310 may be identified by task template generator 135 from task database 125 and/or the tasks may be provided to task template generator 135 by task recognition engine 115 based on information that was received from task application 110. Task template generator 135 may identify an entity category of "[fruit]" from entity database 130 and identify tasks 300, 305, and 310 based on the tasks including aliases of entities that are members of the entity category [fruit]. In some implementations, the task objects of one or more tasks may be an identifier of an entity. Task template generator 135 may identify the tasks by identifying tasks that include task objects that are members of the entity category.

Task template generator 135 may determine a task template based on the common and/or similar components of the identified tasks. For example, task template generator 135 may determine that one or more of the plurality of tasks have a task action of "buy." Additionally, task template generator 135 may determine that the tasks of the plurality of tasks include entities of the same entity category. For example, task template generator 135 may determine that all of the tasks of the plurality of tasks include a task entity that is a fruit. Task template generator 135 may determine a task template that includes the term or entity that is common to the task objectives and that includes an alias of an entity that is a member of the entity category. For example, task template generator 135 may determine a task template of "buy [fruit]" based on identifying a plurality of tasks that includes the task action "buy" and an alias of an entity that is a member of [fruit].

Task template generator 135 may determine a task group of tasks that conform to the determined task template. The task group may include one or more tasks that were utilized to determine the task template and/or other tasks that are provided by task recognition engine 115 and/or identified from task database 125. Some of the identified tasks may be associated with completion steps and some of the identified tasks may not have an associated task completion step. Task template generator 135 may identify one or more task completion steps that are associated with tasks that conform to the task template. The task completion steps for tasks may be task completion steps that were determined by the task recognition engine 115 and provided to task template generator 135 and/or task completion steps that are associated with tasks that were identified from task database 125. For example, referring to FIG. 3, task template generator 135 may identify the task completion steps that are associated with tasks 300, 305, and 310. In the illustrated example, all of the tasks are associated with the task completion step of "Travel to the grocery store." In some implementations, task template generator 135 may utilize the identified task completion steps of one or more tasks of the task group to determine the similarity of the tasks. For example, task template generator 135 may determine that tasks 300, 305 and 310 are similar based in part on the tasks having the same task completion step.

In some implementations, a similarity measurement may be determined for each task that is indicative of whether the task conforms to the task template. The similarity measurement may be based on, for example, the similarity between the terms of the task template and the terms that are in the textual representation of a task objective. For example, for a task template of "Buy [fruit]," a similarity measurement of the similarity between the task template and the task with a task objective of "Buy bananas" may be indicative of the similarity between the entity or term "Buy" that is present in both the task template and the task objective. Also, for example, a similarity measurement may be determined based on the conformity of the entity that is associated with the task object of the task, "bananas," and the entity category of the task template, [fruit].

Task template generator 135 may associate a task completion step that is associated with one of the tasks of the task group with the task template. In some implementations, task template generator 135 may determine whether to associate a given task completion step with a task template based on a count of occurrences of tasks of the task group (e.g., the number of tasks and/or percentage of tasks) that are associated with the task completion step. For example, referring to FIG. 3, task template generator 135 may determine that the identified tasks 300, 305, and 310 are each associated with the task completion step "Travel to the grocery store" and associate the task completion step with task template 315 based on all of the tasks of the task group being associated with the task completion step "Travel to the grocery store." Also, for example, task template generator 135 may identify a fourth task of "Buy pumpkins" that conforms to the template and that is associated with the task completion step "go to the farmer's market." Task template generator 135 may not associate the task completion step "go to the farmer's market" with task template 315 if that task completion step does not appear a threshold number of times in the identified tasks of the task group.

In some implementations, a task completion step may be associated with a task template only if the popularity of usage of the task completion step satisfies a threshold. For example, one or more tasks of the task group for the task template of "Travel to [business]" may be associated with the task completion steps "Drive to [business]" and "Fly to [business]" and task template generator 135 may determine that previous users have utilized "Drive to [business]" with a greater frequency than "Fly to [business]." Task template generator 135 may associate, based on the frequency of past usage of each of the task completion steps, the task completion step "Drive to [business]" and not the task completion step "Fly to [business]" if the usage of "Fly to [business]" is below a threshold usage level.

In some implementations, task template generator 135 may determine multiple entity categories for a task template based on identified tasks. For example, referring to FIG. 4, an example of identified tasks and a task template with multiple entity categories is provided. Tasks 400, 405, and 410 may be identified in task database 125 by task template generator 135 and/or received from task recognition engine 115. The task descriptions of the tasks are provided in a bold box, and the task completion steps that are associated with the tasks are provided below the task descriptions. The task template 415 includes a template in a bold box with task completion steps that have been associated with the task template below the template.

Task template generator 135 may determine a similarity score for tasks 400, 405, and 410, and determine that the similarity between the tasks satisfies a threshold task similarity measurement. For example, task template generator 135 may determine that entities with aliases of the task actions of tasks 400, 405, and 410 are members of the same entity category (i.e., "Travel" and "Drive" may be members of a [travel methods] entity category). Also, for example, task template generator 135 may determine that the tasks include aliases of task entities that are members of the same entity category (i.e., "Business 1," "Business 2," and "Business 3" entities members of a [business] entity category). Task template generator 135 may determine a task template based on similarity between the tasks of the identified plurality of tasks. In the illustrated example, task template generator 135 determines a task template of "[travel methods] [business]" based on identifying that the task descriptions of tasks 400, 405, and 410 are similar. A task group may be determined and task completion steps that are associated with the conforming tasks are identified and associated with the task template 415.

In the illustrated example, the task completion steps that are associated with the task template 415 include an entity category that may be utilized to determine task completion steps for other tasks that conform to the template. An entity category that is present in one or more task completion steps may be replaced by an alias of an entity that is a member of the entity category when the task is provided to the user. For example, task template 415 includes a task completion step of "Take car to [business]," and the user may be provided with the task completion step of "Take car to Business 5" for a task of "Travel to Business 5" based on "Business 5" being a member of a [business] category and that "Business 5" is the member of the entity category that is present in the task objective.

Task recognition engine 115 receives actions of a user and/or additional information that are associated with the user from task application 110 via communication network 101. Based on the received information, the task recognition engine 115 may determine that the user has interest in creating a task. For example, the user may submit a search query of "pay my cellular phone bill" to a web search engine and task application 110 may identify the submitted query and provide the query, one or more search results of the search query, and/or one or more webpages that were accessed by the user, to task recognition engine 115. In some implementations, task application 110 may provide task recognition engine 115 with additional information that may be utilized to determine a task. For example, task application 110 may identify an email from a cellular phone company of a user that includes the name of the cellular phone company of the user, and task application 110 may provide the name of the cellular phone company to task recognition engine 115 in addition to information regarding the user interest in creating a task. Task recognition engine 115 may determine a task to associate with the user based on information that is received from the task application 110 and provide the task to task completion step engine 120.

Task completion step engine 120 may identify one or more completion steps to associate with a task that is received from task recognition engine 115. In some implementations, task completion step engine 120 may identify one or more entities in entity database 130 that are associated with aliases of one or more components of a task description and associate a completion step with the task based on information that is associated with the identified entities. For example, a task may be "pay cell phone bill," and task completion step engine 120 may identify an entity that is associated with the cellular phone company of the user in entity database 130. The identified entity may be associated with the phone number of the cellular phone company, such as "555-5555." Task completion step engine 120 may associate a task of "Call 555-5555" with the task of "pay my cell phone bill" based on identifying that the phone number "555-5555" is associated with the cellular phone company entity.

In some implementations, task completion step engine 120 may determine one or more completion steps by determining whether a given task conforms to a task template. In some instances, task completion step engine 120 may not be able to determine task completion steps for a task and/or task completion step engine 120 may determine one or more task completion steps, but not all possible task completion steps for the task. For example, task application 110 may not identify enough information to provide to task completion step engine 120 so that task completion steps for the task may be determined. Also, for example, task completion step engine 120 may not identify sufficient information from task database 125 and/or entity database 130 to determine a task completion step for a task. In some implementations, task completion step engine 120 may determine whether tasks that have associated task completion steps may be compared to one or more task templates to determine whether additional task completion steps may be associated with the task. For example, task completion step engine 120 may determine task completion steps for a given task by consulting one or more databases and/or based on the provided additional information, and additionally determine whether the task conforms to one or more task templates.

Task recognition engine 115 may identify one or more task completion steps that are associated with the identified task template but not associated with the determined task. Based on the task conforming to the template, task completion step engine 120 may associate task completion steps that are associated with the identified task template with the determined task. The task completion steps for the determined task may be provided to the user as described herein and/or the task with associated task completion steps may be stored in task database 125 for later utilization by one or more components.

In some implementations, task recognition engine 115 may determine that a task conforms to multiple task templates. For example, the plant "rhubarb" may be a member of an entity category "[produce]" and an entity category "[medicine]" based on different uses for the rhubarb plant. Task recognition engine 115 may determine that the task "Buy rhubarb" conforms to a task template of "Buy [produce]" and additionally to a task template of "Buy [medicine]." In some implementations, task recognition engine 115 may identify the task completion steps that are associated with all of the multiple task templates and associate the task completion steps with the task. In some implementations, task recognition engine 115 may identify one or more task templates as the most likely task templates and associate only the task completion steps that are associated with the most likely task template or task templates with the task. For example, task recognition engine 115 may determine that "rhubarb" is more likely to be associated with tasks that include purchasing rhubarb as produce than with tasks that include purchasing the plant as medicine, and task recognition engine 115 may associate the task completion steps that are associated with "Buy [produce]" (which may include, for example, "Go to the grocery store") and not the task completion steps that are associated with the task template "Buy [medicine]" (which may include, for example, "Go to the pharmacy"). In some implementations, strength of associations of entities with entity categories may be determined via, for example, entity database 130.

Many other configurations are possible having more or less components than the environment shown in FIG. 1. For example, although the components are each illustrated alone in FIG. 1, it is understood that one or more of the computing device 105, task recognition engine 115, task completion step engine 120, task database 125, entity database 130, and/or task template generator 135 may be combined in some implementations.

Figure 5:
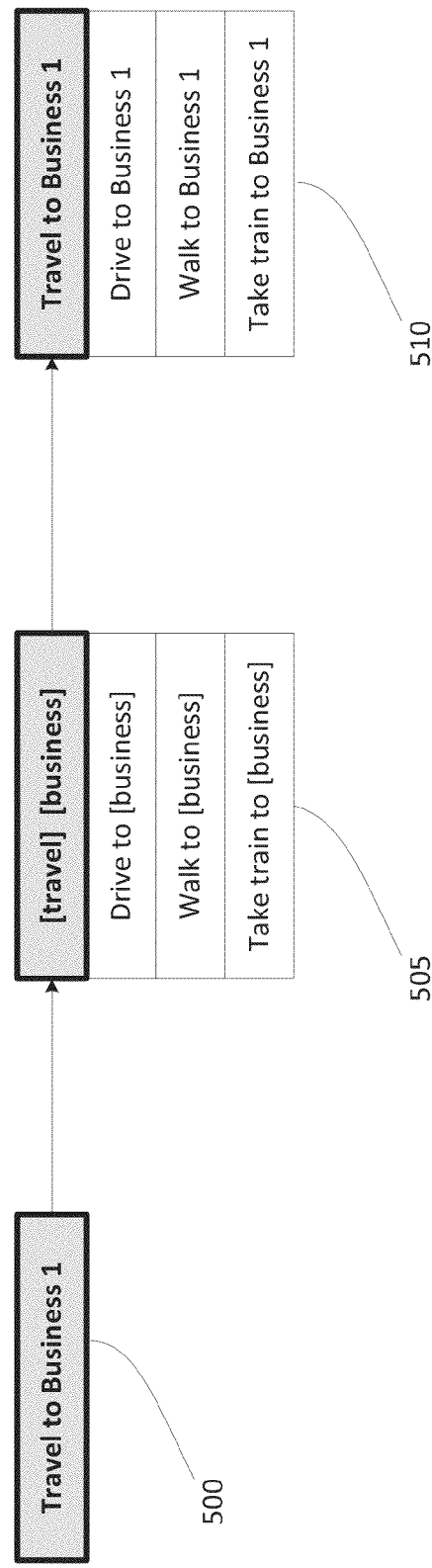
FIG. 5 is an example of utilizing a task template that has been has associated with completion steps to determine task completion steps for a task that conforms to the task template.

Referring to FIG. 5, an example of associating task completion steps with a task based on determining that the task conforms to a task template is provided. In the illustrated example, task recognition engine 115 may determine a task 500 based on information that is provided by task application 110 as described herein. Task recognition engine 115 may provide the task to task completion step engine 120 to determine one or more task completion steps to associate with the task. Task completion step engine 120 may identify the task template 505 based on task 500 conforming to the task template. For example, task completion step engine 120 may determine that the provided task has a task objective that includes a task action ("Travel") that is associated with an entity that is a member of the entity category [travel] and additionally includes an alias of a task entity ("Business 1") that is a member of the entity category [business]. Based on the task description "Travel to Business 1" of task 500 conforming to task template 505, task completion step engine 120 may associate one or more of the task completion steps of task template 505 with task 500. For example, task completion step engine 120 may associate the task completion steps of task template 505 with task 500, which may result in task 510. Task 510 may be provided to task recognition engine 115 and/or task completion step engine 120. Task 510 may be utilized to provide one or more task completion steps to a user and/or task 510 may be stored with associated task completion steps in task database 125.

In some implementations, a ranking may be assigned to one or more task completion steps that are associated with a task template and task completion step engine 120 may determine whether to associate a given task completion step with a conforming task based on the associated ranking. For example, a task completion step that was associated with multiple tasks of the task group that was utilized to determine the task template may have a rank that is more indicative of assigning the task completion step with a conforming task than a task completion step that was associated with fewer tasks of the task group.

In some implementations, a task with one or more associated task completion steps may be more likely to conform to a task template if a task completion step that is associated with the task matches a task completion step that is associated with the task template. For example, a task of "Buy bananas" may be associated with a task completion step of "Go to the grocery store," and a task template of "Buy [fruit]" may be associated with completion steps of "Go to the grocery store" and "Go to the farmer's market." Because the task conforms to the task template and shares a task completion step with a task completion step that is associated with the task template, the task may be more likely to be associated with the task completion step "Go to the farmer's market" than a task that does not share the task completion step "Go to the grocery store" with the task template.

Figure 2:
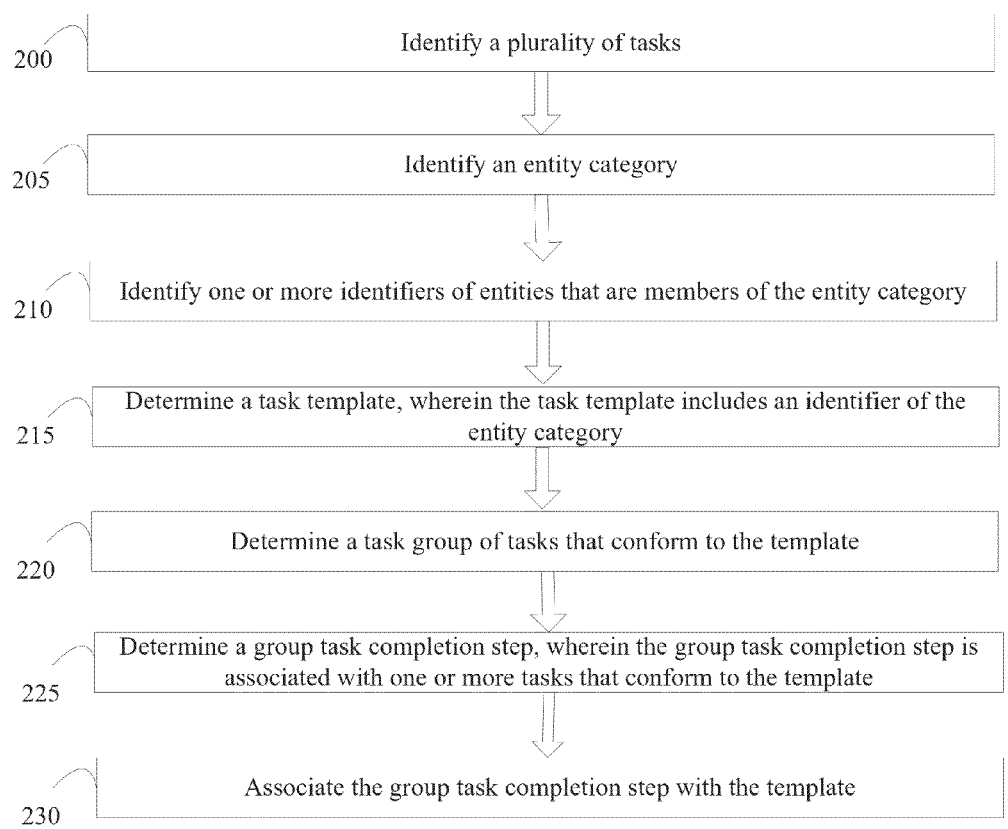
FIG. 2 is a flow chart illustrating an example method of associating a task completion step of a task with a task template.

Referring to FIG. 2, a flow chart illustrating an example method of associating a task completion step of a task with a task template is provided. Other implementations may perform the steps in a different order, omit certain steps, and/or perform different and/or additional steps than those illustrated in FIG. 2. For convenience, aspects of FIG. 2 will be described with reference to one or more components of FIG. 1 that may perform the method, such as task template generator 135 and/or task recognition engine 115.

At step 200, a plurality of tasks is identified. In some implementations, the plurality of tasks is identified by a component that shares one or more characteristics with task template generator 135. In some implementations, tasks may be identified from a database that shares one or more characteristics with task database 125. In some implementations, one or more tasks may be provided to task template generator 135 by a component that shares one or more characteristics with task recognition engine 115. In some implementations, a task that is identified may be associated with one or more task completion steps. In some implementations, a task that is identified may not be associated with a task completion step.

Identified tasks include a task action and a task object. In some implementations, the task action and/or the task object may be an entity and/or an identifier of an entity in entity database 130. For example, a task may have a task action that is associated with the entity for the action "Buy." Also, for example, a task may have a task object that is associated with an entity for the fruit "bananas." In some implementations, a task action and/or a task object of a task may be a textual representation of an alias of an entity in entity database 130. For example, a task may have a task action of "Purchase," and the task action may be an alias of an entity for the action "Purchase."

At step 205, an entity category is determined. An entity category may be determined by a component that shares one or more characteristics with task template generator 135. In some implementations, an entity category may be identified and/or determined based on one or more entities from entity database 130. In some implementations, the entity category may be determined based on one or more entities that are identified from the plurality of tasks in step 200. For example, task template generator 135 may identify a task entity and/or a textual representation of a task entity in a task of the plurality of tasks that were identified at step 200, and determine that the entity category is the category of the identified task entity. In some implementations, task template generator 135 may determine an entity category first and identify a plurality of tasks at step 200 that each includes a task entity of the determined entity category.

At step 210, one or more identifiers of entities that are members of the entity category are identified. In some implementations, the identifiers may be aliases of the entities that are members of the entity category that was identified at step 205. In some implementations, the aliases are textual representations of the associated entities. For example, for an entity category of "[fruit]" task template generator 135 may identify an entity that is a member of the entity category and that is associated with the textual alias "banana." In some implementations, the identifiers are a unique identifier to identify the associated entity. For example, an identifier of an entity may be a memory address and/or database reference number that uniquely identifies an entity in entity database 130.

At step 215, a task template is determined. The task template includes the entity category that was identified at step 205 and may include one or more additional entities and/or one or more additional terms. For example, a task template may include the entity category [fruit], which may be an entity category that is associated with fruit entities. Also, for example, a task template may include an entity "Buy" in addition to the entity category [fruit]. In some implementations, one or more terms in a task template may be associated with a task action and/or a task object. For example, a task template may include the term "Buy" and that term may be associated with a task action of "Buy." In some implementations, a task template may include one or more entities. For example, a task template may include the term "buy," which may be associated with an entity of "buy" and/or the task template may include an identifier of an entity of "Buy" that may be utilized to identify the associated entity in entity database 130.

At step 220, a task group of one or more tasks that conform to the task template is determined. The conforming tasks of the task group may be identified by a component that shares one or more characteristics with task template generator 135. In some implementations, the task group may include one or more of the plurality of tasks from step 200. In some implementations, the task group may include additional and/or alternate tasks. The tasks of the task group are conforming if a given task includes an identifier of an entity that is a member of the entity category that was identified in step 205 and that includes any additional terms and/or entities that are components of the task template. In some implementations, a similarity measurement may be determined that is indicative of the conformity of a task with the task template and tasks with a similarity measurement that satisfies a threshold value may be included in the task group.

For example, a task group of tasks that conform to the task template "Buy [fruit]" may include tasks that have a task object that is an entity of the entity category "[fruit]." Additionally or alternatively, a task group of tasks that conform to the task template "Buy [fruit]" may include tasks that have a task action that is associated with the entity "Buy." Also, for example, the task group may include only tasks that include both the task action of "Buy" and a task object that is a member of the entity category "[fruit]."

At step 225, a task completion step that is associated with one or more of the tasks of the task group is determined. In some implementations, the determined group task completion step may be a task completion step that is associated with a threshold number of the tasks of the task group. For example, a task completion step may be selected as a group task completion step only if a majority of the tasks of the task group are associated with the task. In some implementations, multiple task completion steps may be identified. For example, one or more tasks of the task group may be associated with a first task completion step and one or more of the tasks of the task group may be associated with a second task completion step, and task template generator 135 may determine that both of the task completion steps should be associated with the task template at step 230.

At step 230, the task completion step or task completion steps that were identified at step 225 are associated with the task template of step 215. The task template may be stored in one or more databases and utilized by one or more components to associate a completion step with a task that conforms to the task template. For example, a task template may be "Buy [fruit]" with a task completion step of "Travel to the farmer's market," and the conforming task of "buy oranges" may be associated with the task completion step of "Travel to the farmer's market" based on the task conforming to the task template.

FIG. 6 is a block diagram of an example computer system 610. Computer system 610 typically includes at least one processor 614 which communicates with a number of peripheral devices via bus subsystem 612. These peripheral devices may include a storage subsystem 624, including, for example, a memory subsystem 626 and a file storage subsystem 628, user interface input devices 622, user interface output devices 620, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to determine a task template, identify one or more tasks that conform to the task template, and associate a task completion step that is associated with one of the conforming tasks with the task template.

These software modules are generally executed by processor 614 alone or in combination with other processors. Memory 626 used in the storage subsystem can include a number of memories including a main random access memory (RAM) 630 for storage of instructions and data during program execution and a read only memory (ROM) 632 in which fixed instructions are stored. A file storage subsystem 628 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 628 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer implemented method, comprising:
identifying an entity category, wherein the entity category is a grouping of entities that share one or more aspects in common;
determining a task template, wherein the task template includes a task action identifier and a task object identifier, and wherein one of the task action identifier and the task object identifier is an indication of the entity category;
identifying a plurality of tasks, wherein each of the plurality of tasks is associated with a task entity, and wherein at least one of the plurality of tasks is associated with a task completion step;
determining a task group of one or more of the plurality of tasks that conform to the task template, wherein a given task of the task group conforms to the task template if the task entity of the task is a member of the entity category;
determining a group task completion step, wherein the group task completion step is based on a task completion step associated with one or more of the tasks of the task group; and
associating the group task completion step with the task template.

2. The method of claim 1, wherein each of the plurality of tasks includes a task action and a task object.

3. The method of claim 2, wherein the task action of each of the tasks is the task entity, wherein the task object identifier is an indication of a template entity, and wherein conformity of a task to the task template is based on similarity between the template entity and the task object.

4. The method of claim 2, wherein the task object of each of the tasks is the task entity, wherein the task action identifier is an indication of a template entity, and wherein conformity of a task to the task template is based on similarity between the template entity and the task action.

5. The method of claim 2, wherein at least one of the task action and the task object of each of the tasks of the task group is associated with a task textual representation.

6. The method of claim 5, wherein at least one of the task action identifier and the task object identifier is associated with a template textual representation, wherein conformity of a given task of the task group is based on textual similarity between the task textual representation and the template textual representation.

7. The method of claim 5, wherein conformity of each task to the task template includes determining whether the task textual representation of a given task of the task group is an alias of an entity that is a member of the entity category.

8. The method of claim 1, further comprising:
identifying an additional task completion step for an additional task of the task group;
associating the additional task completion step with the task template; and
ranking the group task completion step and the additional task completion step for the task template.

9. The method of claim 8, wherein the ranking of the group task completion step and the additional task completion step is based on counts of occurrences of associations of the group task completion step and the additional task completion step to the tasks of the task group.

10. The method of claim 9, wherein the ranking of the group task completion step is higher than the ranking of the additional task completion step when the count of occurrences of associations of the group task completion step is greater than the count of occurrences of associations of the additional task completion step.

11. The method of claim 8, wherein associating the group task completion step with the task template occurs only when the ranking of the group task completion step satisfies a threshold.

12. The method of claim 1, further comprising:
receiving an additional task of a user;
determining a similarity measurement, wherein the similarity measurement is indicative of conformity of the additional task to the task template; and
associating the group task completion step with the additional task if the similarity measurement satisfies a threshold value.

13. The method of claim 12, further comprising providing the group task completion step to the user in response to receiving the additional task of the user.

14. The method of claim 1, further comprising:
identifying an uncategorized task of the plurality of tasks, wherein the uncategorized task is associated with an uncategorized task completion step, and wherein the uncategorized task is not a task of the task group;
determining that the uncategorized task conforms to the task template; and
associating the uncategorized task with the task group.

15. The method of claim 14, further comprising:
associating the uncategorized task completion step with the task template.

16. The method of claim 1, wherein the group task completion step includes an indication of a completion entity category.

17. The method of claim 16, wherein the completion entity category is the entity category.

18. The method of claim 16, wherein the group task completion step includes a completion action and a completion object, and wherein one of the completion action and the completion object is associated with the completion entity category.

19. A system including memory and one or more processors operable to execute instructions in memory, comprising instructions to:
identify an entity category, wherein the entity category is a grouping of entities that share one or more aspects in common;

determine a task template, wherein the task template includes a task action identifier and a task object identifier, and wherein one of the task action identifier and the task object identifier is an indication of the entity category;

identify a plurality of tasks, wherein each of the plurality of tasks is associated with a task entity, and wherein at least one of the plurality of tasks is associated with a task completion step;

determine a task group of one or more of the plurality of tasks that conform to the task template, wherein a given task of the task group conforms to the task template if the task entity of the task is a member of the entity category;

determine a group task completion step, wherein the group task completion step is based on a task completion step associated with one or more of the tasks of the task group; and associate the group task completion step with the task template.

20. The system of claim 19, wherein the instructions further include instructions to:

identify an additional task completion step for an additional task of the task group;

associate the additional task completion step with the task template; and rank the group task completion step and the additional task completion step for the task template.

21. The system of claim 19, wherein the instructions further include instructions to:

receive an additional task of a user;

determine a similarity measurement, wherein the similarity measurement is indicative of conformity of the additional task to the task template; and associate the group task completion step with the additional task if the similarity measurement satisfies a threshold value.

22. The system of claim 19, wherein the instructions further include instructions to:

identify an uncategorized task of the plurality of tasks, wherein the uncategorized task is associated with an uncategorized task completion step, and wherein the uncategorized task is not a task of the task group;

determine that the uncategorized task conforms to the task template; and associate the uncategorized task with the task group.

23. The system of claim 22, wherein the instructions further include instructions to:

associate the uncategorized task completion step with the task template.

24. A non-transitory computer readable storage medium storing at least one program configured for execution by at least one processor of a computer system, the at least one program comprising instructions to:

identify an entity category, wherein the entity category is a grouping of entities that share one or more aspects in common;

determine a task template, wherein the task template includes a task action identifier and a task object identifier, and wherein one of the task action identifier and the task object identifier is an indication of the entity category;

identify a plurality of tasks, wherein each of the plurality of tasks is associated with a task entity, and wherein at least one of the plurality of tasks is associated with a task completion step;

determine a task group of one or more of the plurality of tasks that conform to the task template, wherein a given task of the task group conforms to the task template if the task entity of the task is a member of the entity category;

determine a group task completion step, wherein the group task completion step is based on a task completion step associated with one or more of the tasks of the task group; and associate the group task completion step with the task template.

\* \* \* \* \*